Feb. 9, 1937.   P. J. LEGEROS   2,070,439
DEEP FAT FRYER
Filed Aug. 29, 1936
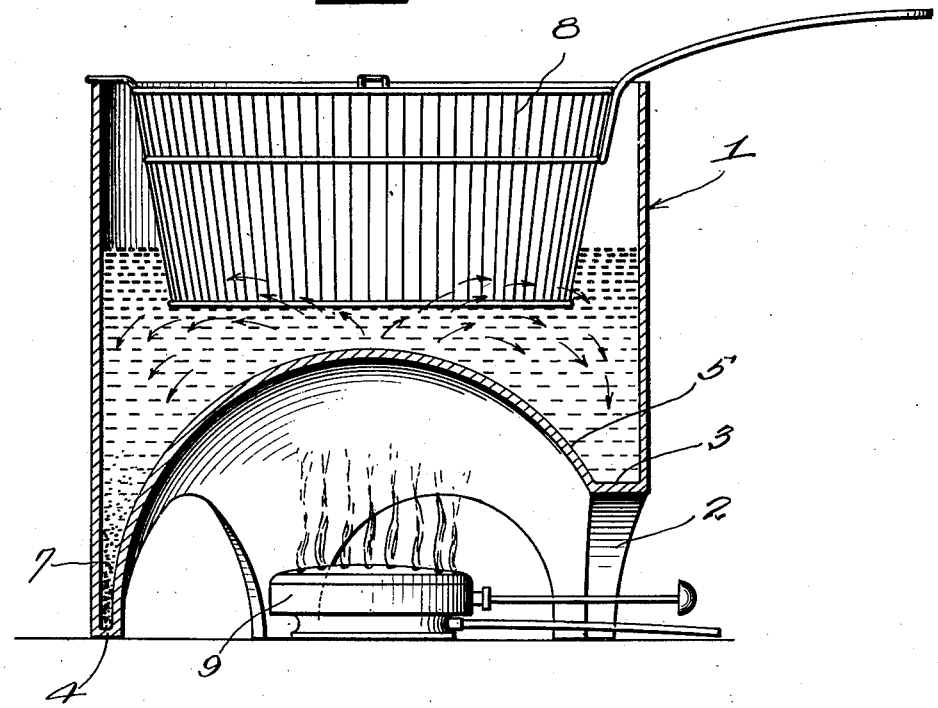
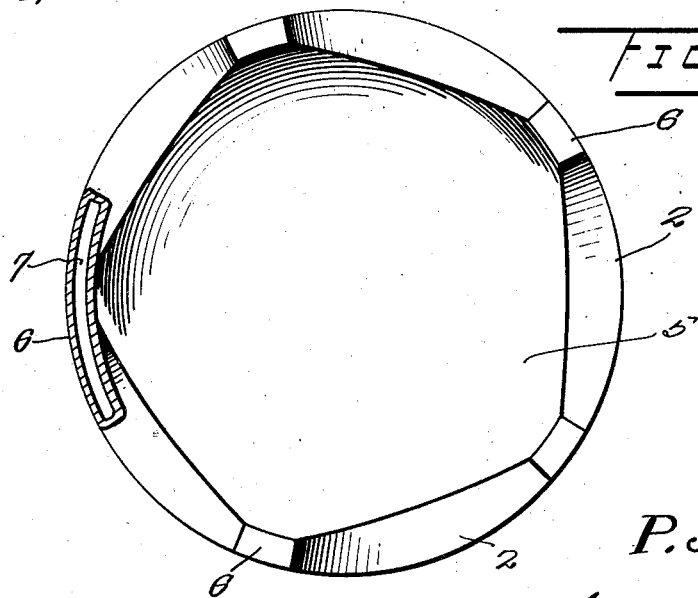
Inventor
P. J. Legeros
By Watson E. Coleman
Attorney Patented Feb. 9, 1937

2,070,439

UNITED STATES PATENT OFFICE 2,070,439

DEEP FAT FRYER

Peter J. Legeros, Brookings, S. Dak.

Application August 29, 1936, Serial No. 98,572

2 Claims. (Cl. 53—7)

This invention relates to the class of kitchen and table articles and pertains particularly to an improved receptacle for frying.

The present invention has for its primary object to provide a novel type of receptacle which is designed primarily for frying in deep fat, in which a novel means is provided for trapping the particles of food which may escape from the frying basket and preventing them from circulating in the fat during the frying operation.

Another object of the invention is to provide an improved deep fat frying vessel having a novel form of bottom beneath which the fuel burner is placed, which concentrates the heat at the central part of the receptacle and effects a lateral dispersion of the heat so that convection currents will be set up which will carry loosened food particles to the outer side of the receptacle where they will be made to lodge in narrow receiving areas and prevented from recirculating.

Still another object of the invention is to provide a deep fat fryer having a substantially semispherical bottom and supporting legs of hollow form and relatively shallow so as to provide areas of relatively cool fat where little movement occurs so that the food particles settling therein will stay in these areas.

The invention will be best understood from a consideration of the following detailed description taken in connection with the accompanying drawing forming part of the specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a view in vertical section through a fryer constructed according to the present invention.

Figure 2 is a bottom plan view of the device, one leg thereof being in horizontal section.

Referring now more particularly to the drawing, wherein like numerals of reference designate corresponding parts throughout the several views, the numeral 1 designates the body of the receptacle, which is illustrated as being of circular cross section and having an open top. The body is provided at its lower edge with a series of semicircular open areas 2, each of which is bordered by the inwardly extending bottom wall flange 3, which is likewise of arcuate configuration and which merges at each end with the inwardly extending horizontal base portion 4.

The bottom of the receptacle is indicated by the numeral 5 and is preferably of the semi-spherical configuration here illustrated and is provided with corresponding semi-circular openings in its lower edge. The edges of these openings coincide with the openings 2 in the wall portion 1 of the receptacle and are joined to the inner edges of the connecting portions 3 so that it will thus be seen that the receptacle is provided with the hollow legs 6 which are separated by archways. The areas between the wall of the receptacle and the wall of the bottom 5 in the legs are relatively narrow, as indicated at 7, and these narrow areas constitute means for trapping particles of food which may escape from the food which is carried in the wire basket 8 when the same is in the hot fat.

The openings between the legs 6 also provide a means for the insertion beneath the bottom 5 of a burner of any suitable character, such as that indicated by the numeral 9.

In the use of the present device, the same is filled to a level well above the highest point of the bottom 5 with grease so that when the food basket 8 is placed in the receptacle, its lower part will extend down into the grease and into relatively close proximity with the bottom 5. When the burner 9 is placed in position below the bottom, the major portion of the heat will be directed toward the center thereof which is the part nearest the basket 8 and this will set up currents through the grease, as indicated by the arrows, the heated grease passing from the center toward the sides of the receptacle and in doing so it will carry with it any particles of food which may fall from the basket. Due to the fact that the grease in the areas 7 will be materially cooler than that at the central part of the receptacle, the movement in these narrow areas will be very small so that the food particles will gravitate laterally over the bottom 5 and into these narrow areas where they will lodge and remain until the receptacle is emptied of the grease and the areas can be cleaned out.

With the construction described, it will be apparent that because of the manner in which the food particles will be trapped, the grease can be used over and over for different food materials without tainting one food material with the flavor of the other.

I claim:—

1. A cooking utensil of the character described comprising a body having a straight vertical wall, a bottom having an overall diameter less than the interior diameter of the body and having a bottom edge in the same plane as the lower edge of the body, said bottom being of a design to extend upwardly a substantial distance into the body and having its highest point at the central part of the body, said body wall and bottom having coinciding openings in the lower edges thereof and connecting portions between the lower edges of the bottom and the body and between the adjacent edges of said openings, said bottom and body adjacent their lower edges being in relatively closely spaced relation whereby to form a receiving means for food particles.

2. A frying receptacle of the character described comprising a hollow body portion and a bottom portion, said bottom portion being substantially semi-spherical and having an overall diameter less than the interior diameter of the body, the lower edges of the bottom and body being in the same plane, recesses formed in the said lower edges of the bottom and body, and horizontal connecting walls between the said lower edges, said walls following the outline of the recesses and the portions of the bottom and body between the recesses, said portions forming legs, and said bottom and body walls in the leg portions being in closely spaced relation to form receiving areas for food particles.

PETER J. LEGEROS.